United States Patent
Dinh et al.

(10) Patent No.: US 10,044,595 B1
(45) Date of Patent: Aug. 7, 2018

(54) SYSTEMS AND METHODS OF TUNING A MESSAGE QUEUE ENVIRONMENT

(71) Applicant: Dell Products L.P., Round Rock, TX (US)

(72) Inventors: Hung Dinh, Austin, TX (US); Sijoy Thomas, Austin, TX (US); Krishna Mohan Akkinapalli, Round Rock, TX (US); Roy Niswanger, Round Rock, TX (US); Vinod Kumar, Bangalore (IN); Craig Van Der Bogart, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 147 days.

(21) Appl. No.: 15/198,761

(22) Filed: Jun. 30, 2016

(51) Int. Cl.
*H04L 12/26* (2006.01)
*H04L 12/863* (2013.01)

(52) U.S. Cl.
CPC .............. *H04L 43/50* (2013.01); *H04L 47/62* (2013.01)

(58) Field of Classification Search
CPC ..... H04L 41/0604; H04L 41/50; H04L 51/26; H04L 67/26; H04L 45/00; H04L 45/56; H04W 4/12; G06F 9/546
See application file for complete search history.

(56) References Cited

U.S. PATENT DOCUMENTS

| | | | |
|---|---|---|---|
| 8,141,103 B2 | 3/2012 | Harran et al. | |
| 8,572,627 B2 | 10/2013 | Dar et al. | |
| 2002/0111820 A1* | 8/2002 | Massey | G06Q 10/06 709/200 |
| 2003/0233466 A1 | 12/2003 | Kinkade | |
| 2005/0018611 A1* | 1/2005 | Chan | H04L 41/147 370/241 |
| 2005/0198247 A1* | 9/2005 | Perry | H04L 7/0008 709/223 |
| 2005/0198295 A1* | 9/2005 | Turkoglu | H04L 41/5045 709/225 |

(Continued)

OTHER PUBLICATIONS

IBM Support; "Recommended Fixes for WebSphere MQ"; http://www-01.ibm.com/support/docview.wss?uid=swg27006037; Oct. 2012; 6 pages.

(Continued)

*Primary Examiner* — Ninos Donabed
(74) *Attorney, Agent, or Firm* — Winstead PC

(57) ABSTRACT

In one embodiment, a method is performed by a computer system. The method includes determining base values of multilayer configuration settings of a message queue environment, where the multilayer configuration settings are distributed across a plurality of layers of the message queue environment. The method also includes executing a stress test on the message queue environment using the determined base values of the multilayer configuration settings. The method also includes systematically adjusting the multilayer configuration settings and repeating the stress test at least until the message queue environment satisfies a performance requirement. The method also includes storing a set of values of the multilayer configuration settings for which the message queue environment has satisfied the performance requirement. The method also includes using the stored set of values for a subsequent execution of the message queue environment.

17 Claims, 8 Drawing Sheets

(56) References Cited

U.S. PATENT DOCUMENTS

| | | | |
|---|---|---|---|
| 2006/0059257 A1* | 3/2006 | Collard | G06F 9/546 709/224 |
| 2006/0184667 A1* | 8/2006 | Clubb | H04L 1/1635 709/224 |
| 2008/0133646 A1* | 6/2008 | Azulai | G06F 9/541 709/202 |
| 2008/0147777 A1* | 6/2008 | Azulai | G06F 9/541 709/202 |
| 2008/0147839 A1* | 6/2008 | Azulai | H04L 41/0253 709/223 |
| 2008/0288577 A1* | 11/2008 | Clubb | H04L 29/06 709/202 |
| 2009/0299680 A1* | 12/2009 | Gibbs | G06F 11/3664 702/119 |
| 2010/0153546 A1* | 6/2010 | Clubb | H04L 1/1635 709/224 |
| 2010/0228829 A1* | 9/2010 | Niv | G06F 17/30943 709/206 |
| 2012/0331030 A1* | 12/2012 | Banks | G06F 9/544 709/201 |
| 2013/0086183 A1* | 4/2013 | Frank | G06F 9/546 709/206 |
| 2013/0201316 A1* | 8/2013 | Binder | H04L 67/12 348/77 |
| 2013/0212195 A1* | 8/2013 | Bonefas | F02M 25/0809 709/206 |
| 2013/0238785 A1* | 9/2013 | Hawk | G06F 9/5072 709/224 |
| 2013/0304903 A1* | 11/2013 | Mick | H04L 43/0817 709/224 |
| 2014/0365614 A1* | 12/2014 | Branson | H04L 43/026 709/219 |
| 2015/0178838 A1 | 6/2015 | Kemp, II et al. | |

OTHER PUBLICATIONS

Dunn, Tim, et al.; "Configuring and Tuning WebSphere MQ for Performance on Windows and UNIX"; http://www.ibm.com/developerworks/websphere/library/techarticles/0712_dunn/0712_dunn.html; Dec. 26, 2007; 17 pages.

* cited by examiner

```
syscheck:Analyzing Oracle Linux Server release 6.5 Plus settings for WebSphere MQ 7.5.0.5

Operating System Info
Kernel: 2.6.32-431.el6.x86_64
Architecture:x86_64                                                       [Red Hat,SuSE,Ubuntu]    PASS Memory Info
Memory:       Total: 15Gb    Used: 2Gb    Free: 12Gb    REQUIRED>=12GB    PASS
Swap:         Total: 1Gb     Used: 0Gb    Free: 1Gb     REQUIRED>=1GB     PASS CPU Info
Processor:    0 : Intel(R) Xeon(R) CPU E5-2660 0 @ 2.20GHz
Processor:    1 : Intel(R) Xeon(R) CPU E5-2660 0 @ 2.20GHz
Processor:    2 : Intel(R) Xeon(R) CPU E5-2660 0 @ 2.20GHz
Processor:    3 : Intel(R) Xeon(R) CPU E5-2660 0 @ 2.20GHz
Total CPU(s): 4                                          REQUIRED>=4      PASS MQ Data Storage Info
Disk Space    Size: 50G      Used: 3.3G   Avail: 47G    REQUIRED>=10GB    PASS Verify system check output and if any of the resource check fails please add the required hardware or upgrade kernel version
```

FIG. 5

```
kernelcheck:Analyzing kernel settings for MQ server ausslmc11.us.dell.com with kernel version 2.6.32-573.8.1.el6.x86_64

Executing mqconfig now...
Please find the mqconfig output below
mqconfig: Analyzing Red Hat Enterprise Linux Server release 6.5 (Santiago)
         settings for WebSphere MQ v7.5

System V Semaphores
semmsl   (sem:1)  1000 semaphores                      IBM>=500      PASS
semmns   (sem:2)  39 of 512000 semaphores       (0%)   IBM>=256000   PASS
semopm   (sem:3)  500 operations                (0%)   IBM>=250      PASS
semmni   (sem:4)  11 of 2048 sets               (0%)   IBM>=1024     PASS System V Shared Memory
shmmax            6971947673 bytes                     IBM>=268435456  PASS
shmmni            113 of 8192 sets              (1%)   IBM>=4096       PASS
shmall            248109 of 7294967296 pages    (0%)   IBM>=2097152    PASS System Settings
file-max          3776 of 1209382 files         (0%)   IBM>=524288   PASS
tcp_keepalive_time 900 seconds                         IBM<=300      FAIL Current User Limits (mqm)
nofile   (-Hn)    131072 files                         IBM>=10240    PASS
nofile   (-Sn)    131072 files                         IBM>=10240    PASS
nproc    (-Hu)    76 of 65536 processes         (0%)   IBM>=4096     PASS
nproc    (-Su)    76 of 65536 processes         (0%)   IBM>=4096     PASS
```

FIG. 6

```
Comparing /etc/sysctl.conf & /etc/security/limits.conf with gold image configuration...
Comparing sysctl.conf files now ....

net.ipv4.tcp_max_syn_backlog = 2048                    <
                                                       <
                                                       <
fs.file-max = 1209382                                  > net.ipv4.tcp_max_syn_backlog = 2048
##kernel.sem = 500 256000 250 1024                     <
                                                       <
kernel.shmmni = 6400                                   <
# up the kernel pid max, per MQ team                   <
kernel.pid_max = 65536                                 > fs.file-max = 1209382
# Test by MQ team Oct 1                                <
```

Please update sysctl.conf file in server auss.mcjl.us.dell.com with data on the left column by System Administrator with root access

FIG. 7

```
The following are the queue managers identified in austlmc03.us.dell.com
CSMUAT01
MDMCAT02

Enter the queue manager for disk throughput test:CSMUAT01

Checking queue manager status...
CSMUAT01 Running
continuing to run disk performance check...
/appoin/mqm/bin/amqlcmpa -c H -m CSMUAT01 -d 8 -f /mqshare/totalconn/IO/iodumps/iodump1.txt
/appoin/mqm/bin/amqlcmpa -c H -m CSMUAT01 -d 8 -f /mqshare/totalconn/IO/iodumps/iodump2.txt
/appoin/mqm/bin/amqlcmpa -c H -m CSMUAT01 -d 8 -f /mqshare/totalconn/IO/iodumps/iodump3.txt
/appoin/mqm/bin/amqlcmpa -c H -m CSMUAT01 -d 8 -f /mqshare/totalconn/IO/iodumps/iodump4.txt
/appoin/mqm/bin/amqlcmpa -c H -m CSMUAT01 -d 8 -f /mqshare/totalconn/IO/iodumps/iodump5.txt WriteTimeShort  Short(er) term rolling average of current IO latency in milliseconds:.856
WriteTimeLong   Long(er) term rolling average of current IO latency in milliseconds:.854
WriteTimeMax    Rolling average of maximum time to complete IO in milliseconds:1.913
```

FIG. 8

SYSTEMS AND METHODS OF TUNING A MESSAGE QUEUE ENVIRONMENT

BACKGROUND

Technical Field

The present disclosure relates generally to performance optimization and more particularly, but not by way of limitation, to systems and methods of tuning a message queue environment.

History of Related Art

Message queuing systems often run using parameters that are unsatisfactory or not optimal. Message queue environments often perform poorly as a result, which can result in extensive troubleshooting and manual configurations.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including, by a computer system: determining base values of multilayer configuration settings of a message queue environment, where the multilayer configuration settings are distributed across a plurality of layers of the message queue environment, the plurality of layers including a message queue layer, an operating system layer, a network layer and a storage layer. The method also includes executing a stress test on the message queue environment using the determined base values of the multilayer configuration settings. The method also includes systematically adjusting the multilayer configuration settings and repeating the stress test at least until the message queue environment satisfies a performance requirement. The method also includes storing a set of values of the multilayer configuration settings for which the message queue environment has satisfied the performance requirement. The method also includes using the stored set of values for a subsequent execution of the message queue environment. Other embodiments of this aspect include corresponding computer systems, apparatus, and computer programs recorded on one or more computer storage devices, each configured to perform the actions of the methods.

Another general aspect includes an information handling system including at least one processor, where the at least one processor is operable to implement a method including: determining base values of multilayer configuration settings of a message queue environment, where the multilayer configuration settings are distributed across a plurality of layers of the message queue environment, the plurality of layers including a message queue layer, an operating system layer, a network layer and a storage layer. The method also includes executing a stress test on the message queue environment using the determined base values of the multilayer configuration settings. The method also includes systematically adjusting the multilayer configuration settings and repeating the stress test at least until the message queue environment satisfies a performance requirement. The method also includes storing a set of values of the multilayer configuration settings for which the message queue environment has satisfied the performance requirement. The method also includes using the stored set of values for a subsequent execution of the message queue environment. Other embodiments of this aspect include corresponding computer systems, apparatus, and computer programs recorded on one or more computer storage devices, each configured to perform the actions of the methods.

Yet another general aspect includes a computer-program product including a non-transitory computer-usable medium having computer-readable program code embodied therein, the computer-readable program code adapted to be executed to implement a method including: determining base values of multilayer configuration settings of a message queue environment, where the multilayer configuration settings are distributed across a plurality of layers of the message queue environment, the plurality of layers including a message queue layer, an operating system layer, a network layer and a storage layer. The method also includes executing a stress test on the message queue environment using the determined base values of the multilayer configuration settings. The method also includes systematically adjusting the multilayer configuration settings and repeating the stress test at least until the message queue environment satisfies a performance requirement. The method also includes storing a set of values of the multilayer configuration settings for which the message queue environment has satisfied the performance requirement. The method also includes using the stored set of values for a subsequent execution of the message queue environment. Other embodiments of this aspect include corresponding computer systems, apparatus, and computer programs recorded on one or more computer storage devices, each configured to perform the actions of the methods.

BRIEF DESCRIPTION OF THE DRAWINGS

A more complete understanding of the method and apparatus of the present disclosure may be obtained by reference to the following Detailed Description when taken in conjunction with the accompanying Drawings wherein:

FIG. 5 illustrates an example output of an analysis of system attributes and requirements.

FIG. 6 illustrates an example output of an analysis of kernel attributes and requirements.

FIG. 7 illustrates an example output of an analysis of kernel attributes and requirements.

FIG. 8 illustrates an example output of an input/output check.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
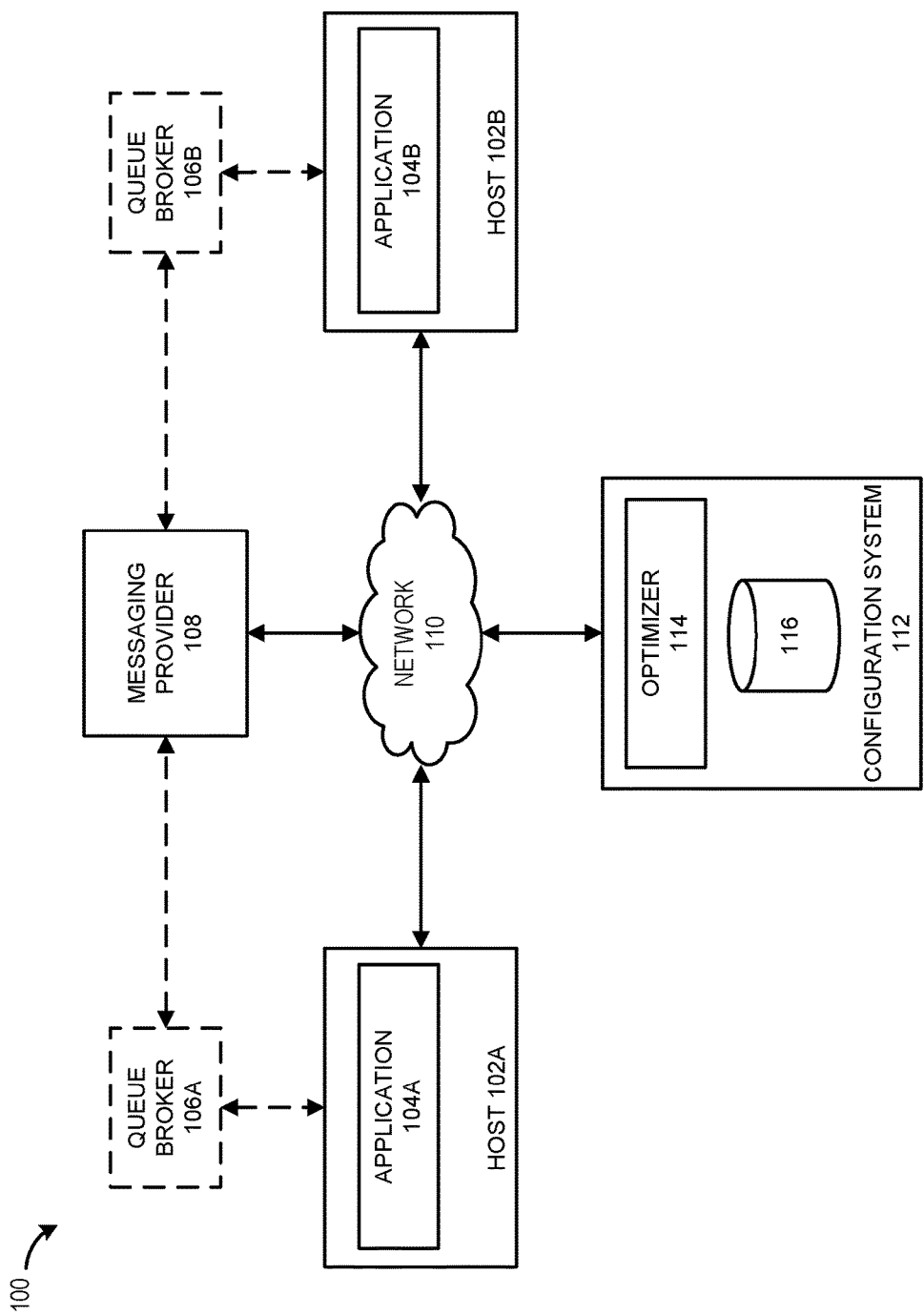
FIG. 1 illustrates an example of a message queue environment.

FIG. 1 illustrates an example of a message queue environment 100. The message queue environment 100 includes a host 102A, a host 102B and a configuration system 112, each of which is operable to communicate over a network 110. Periodically herein, the host 102A and the host 102B may be referenced collectively as hosts 102. The network 110 may be a private network, a public network, a local or wide area network, a portion of the Internet, combinations of the same, and/or the like.

The hosts 102 can be physical and/or virtual hosts. In similar fashion, the configuration system 112 can be a physical or virtual computer system. In some embodiments, the hosts 102 and/or the configuration system 112 can be information handling systems. It should be appreciated that the number of hosts shown in FIG. 1 is merely illustrative in nature. In various embodiments, the message queue environment 100 can include any number of physical or virtual hosts.

In general, a messaging provider 108 mediates messaging operations between the hosts 102. The messaging provider 108 can include, for example, an application programming interface (API) and administrative tools. The messaging provider 108 can use different architectures to route and deliver messages. In an example, in some embodiments, the messaging provider 108 can be, or be implemented on, a centralized message server. In another example, the messaging provider 108 can operate in a peer-to-peer fashion. In these embodiments, routing and delivery functions can be distributed to each of the hosts 102. In such peer-to-peer implementations, the messaging provider 108 can represent a collective result of individual implementations on the hosts 102. Furthermore, in some cases, a combination of centralized and peer-to-peer implementations can be used. In some embodiments, the messaging provider 108 can be, or include, a messaging product such as IBM WEBSPHERE MQ, ORACLE ADVANCE QUEUING and/or JAVA MESSAGE SERVICE.

More particularly, the host 102A and the host 102B are shown to have an application 104A and an application 104B, respectively, running thereon. In the message queue environment 100, application 104A can exchange digital information with remotely executing application 104B over the network 110 via the messaging provider 108. The application 104A and the application 104B can have associated therewith a queue broker 106A and a queue broker 106B, respectively. More specifically, the application 104A can identify a message to send to the application 104B. Initially, the application 104A can send the message to the queue broker 106A, which can also be running on the host 102A. The queue broker 106A can then send the message over the network 110 to the queue broker 106B, which can be running on the host 102B.

When utilizing hypertext transfer protocol (HTTP) based PUT and GET commands, the message queue environment can operate as follows. Application 104A can issue a PUT (e.g., HTTP PUT) command to the queue broker 104A to put (or write) the message onto a queue (which is a particular storage location in memory). Application 104B can then issue a GET (e.g., HTTP GET) command to the queue broker 106B to get (or read) the message from the queue.

The configuration system 112 can be used to optimize message-queue operation of the messaging provider 108 for the message queue environment 100 and/or for a portion thereof (e.g., for a particular application, queue broker, etc.). The configuration system 112 can exist separately as shown, or be part of another computer illustrated or described herein. In the illustrated embodiment, the configuration system 112 is shown to include an optimizer 114 and a data store 116. The data store 116 can include configuration settings for the message-queue environment. In certain embodiments, configuration settings can impact operation of the message provider 108. These configuration settings may not be controlled by one physical or software entity. Rather, in certain embodiments, some or all of these configuration settings can be viewed and treated at a plurality of layers even if those settings are not so organized by the software products at which such settings are established. The plurality of layers can include, for example, a message queue layer, an operating system layer, a network layer and a storage layer. Examples of configuration settings that can be stored in the data store 116 will be described in relation to FIG. 3. The configuration system 112 can be used to identify and set values of configuration settings for the message queue environment 100. Examples of identifying and setting values of configuration settings will be described in relation to FIG. 4.

Figure 2:
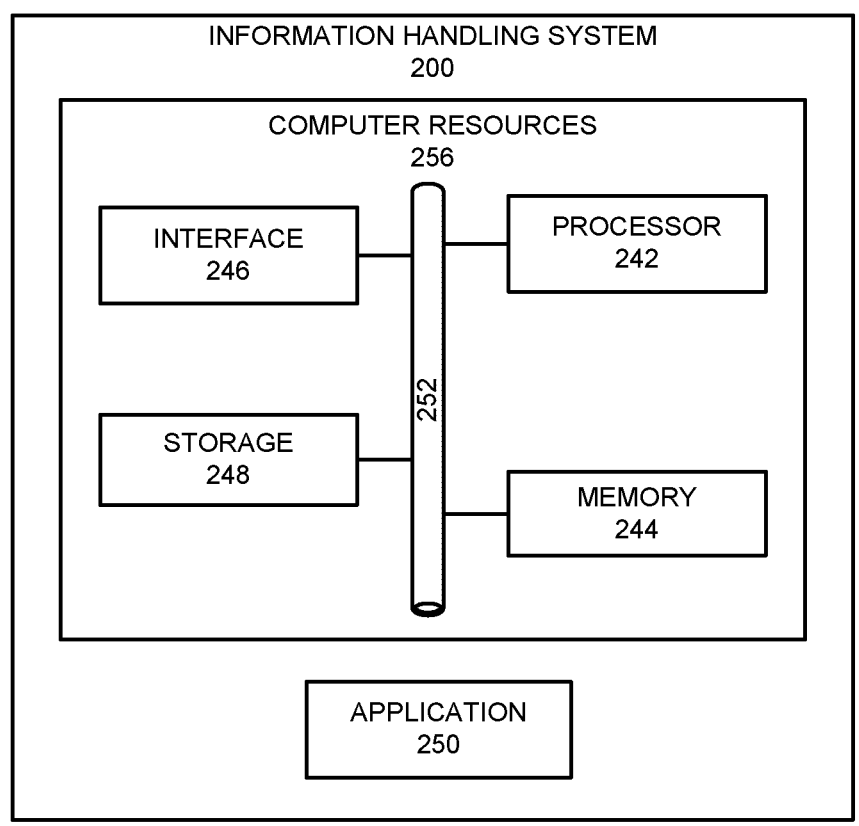
FIG. 2 illustrates an example of an information handling system.

FIG. 2 illustrates an example of an information handling system 200. In some cases, the hosts 102, the messaging provider 108 and/or the configuration system 112 of FIG. 1 can be, or reside on, an information handling system similar to the information handling system 200. The information handling system 200 includes an application 250 operable to execute on computer resources 256. The application 250 can perform, for example, any of the functionality described with respect to the application 104A, the application 104B, the messaging provider 108 and/or the optimizer 114 of FIG. 1. In particular embodiments, the information handling system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the information handling system 200 may comprise any suitable physical form, configuration, number, type and/or layout. As an example, and not by way of limitation, the information handling system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the information handling system 200 may include one or more computer systems; be unitary or distributed; span multiple locations; span multiple machines; or reside in a cloud, which may include one or more cloud components in one or more networks.

In the depicted embodiment, the information handling system 200 includes a processor 242, memory 244, storage 248, interface 246, and bus 252. Although a particular computer system is depicted having a particular number of particular components in a particular arrangement, this disclosure contemplates any suitable computer system having any suitable number of any suitable components in any suitable arrangement.

Processor 242 may be a microprocessor, controller, or any other suitable computing device, resource, or combination of hardware, software and/or encoded logic operable to execute, either alone or in conjunction with other components, (e.g., memory 244), the application 250. Such functionality may include providing various features discussed herein. In particular embodiments, processor 242 may include hardware for executing instructions, such as those making up the application 250. As an example and not by way of limitation, to execute instructions, processor 242 may retrieve (or fetch) instructions from an internal register, an internal cache, memory 244, or storage 248; decode and execute them; and then write one or more results to an internal register, an internal cache, memory 244, or storage 248.

In particular embodiments, processor 242 may include one or more internal caches for data, instructions, or addresses. This disclosure contemplates processor 242 including any suitable number of any suitable internal caches, where appropriate. As an example and not by way of limitation, processor 242 may include one or more instruction caches, one or more data caches, and one or more translation lookaside buffers (TLBs). Instructions in the instruction caches may be copies of instructions in memory 244 or storage 248 and the instruction caches may speed up retrieval of those instructions by processor 242. Data in the data caches may be copies of data in memory 244 or storage 248 for instructions executing at processor 242 to operate on; the results of previous instructions executed at processor 242 for access by subsequent instructions executing at processor 242, or for writing to memory 244, or storage 248; or other suitable data. The data caches may speed up read or write operations by processor 242. The TLBs may speed up virtual-address translations for processor 242. In particular embodiments, processor 242 may include one or more internal registers for data, instructions, or addresses. Depending on the embodiment, processor 242 may include any suitable number of any suitable internal registers, where appropriate. Where appropriate, processor 242 may include one or more arithmetic logic units (ALUs); be a multi-core processor; include one or more processors 242; or any other suitable processor.

Memory 244 may be any form of volatile or non-volatile memory including, without limitation, magnetic media, optical media, random access memory (RAM), read-only memory (ROM), flash memory, removable media, or any other suitable local or remote memory component or components. In particular embodiments, memory 244 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 244 may include one or more memories 244, where appropriate. Memory 244 may store any suitable data or information utilized by the information handling system 200, including software embedded in a computer readable medium, and/or encoded logic incorporated in hardware or otherwise stored (e.g., firmware). In particular embodiments, memory 244 may include main memory for storing instructions for processor 242 to execute or data for processor 242 to operate on. In particular embodiments, one or more memory management units (MMUs) may reside between processor 242 and memory 244 and facilitate accesses to memory 244 requested by processor 242.

As an example and not by way of limitation, the information handling system 200 may load instructions from storage 248 or another source (such as, for example, another computer system) to memory 244. Processor 242 may then load the instructions from memory 244 to an internal register or internal cache. To execute the instructions, processor 242 may retrieve the instructions from the internal register or internal cache and decode them. During or after execution of the instructions, processor 242 may write one or more results (which may be intermediate or final results) to the internal register or internal cache. Processor 242 may then write one or more of those results to memory 244. In particular embodiments, processor 242 may execute only instructions in one or more internal registers or internal caches or in memory 244 (as opposed to storage 248 or elsewhere) and may operate only on data in one or more internal registers or internal caches or in memory 244 (as opposed to storage 248 or elsewhere).

In particular embodiments, storage 248 may include mass storage for data or instructions. As an example and not by way of limitation, storage 248 may include a hard disk drive (HDD), a floppy disk drive, flash memory, an optical disc, a magneto-optical disc, magnetic tape, or a Universal Serial Bus (USB) drive or a combination of two or more of these. Storage 248 may include removable or non-removable (or fixed) media, where appropriate. Storage 248 may be internal or external to the information handling system 200, where appropriate. In particular embodiments, storage 248 may be non-volatile, solid-state memory. In particular embodiments, storage 248 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 248 may take any suitable physical form and may comprise any suitable number or type of storage. Storage 248 may include one or more storage control units facilitating communication between processor 242 and storage 248, where appropriate.

In particular embodiments, interface 246 may include hardware, encoded software, or both providing one or more interfaces for communication (such as, for example, packet-based communication) among any networks, any network devices, and/or any other computer systems. As an example and not by way of limitation, communication interface 246 may include a network interface controller (NIC) or network adapter for communicating with an Ethernet or other wire-based network and/or a wireless NIC (WNIC) or wireless adapter for communicating with a wireless network.

Depending on the embodiment, interface 246 may be any type of interface suitable for any type of network for which information handling system 200 is used. As an example and not by way of limitation, information handling system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The information handling system 200 may include any suitable interface 246 for any one or more of these networks, where appropriate.

In some embodiments, interface 246 may include one or more interfaces for one or more I/O devices. One or more of these I/O devices may enable communication between a person and the information handling system 200. As an example and not by way of limitation, an I/O device may include a keyboard, keypad, microphone, monitor, mouse, printer, scanner, speaker, still camera, stylus, tablet, touch-screen, trackball, video camera, another suitable I/O device or a combination of two or more of these. An I/O device may include one or more sensors. Particular embodiments may include any suitable type and/or number of I/O devices and any suitable type and/or number of interfaces 246 for them. Where appropriate, interface 246 may include one or more drivers enabling processor 242 to drive one or more of these I/O devices. Interface 246 may include one or more interfaces 246, where appropriate.

Bus 252 may include any combination of hardware, software embedded in a computer readable medium, and/or encoded logic incorporated in hardware or otherwise stored (e.g., firmware) to couple components of the information handling system 200 to each other. As an example and not by way of limitation, bus 252 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 252 may include any number, type, and/or configuration of buses 252, where appropriate. In particular embodiments, one or more buses 252 (which may each include an address bus and a data bus) may couple processor 242 to memory 244. Bus 252 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 242 (such as, for example, one or more internal registers or caches), one or more portions of memory 244, one or more portions of storage 248, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Figure 3:
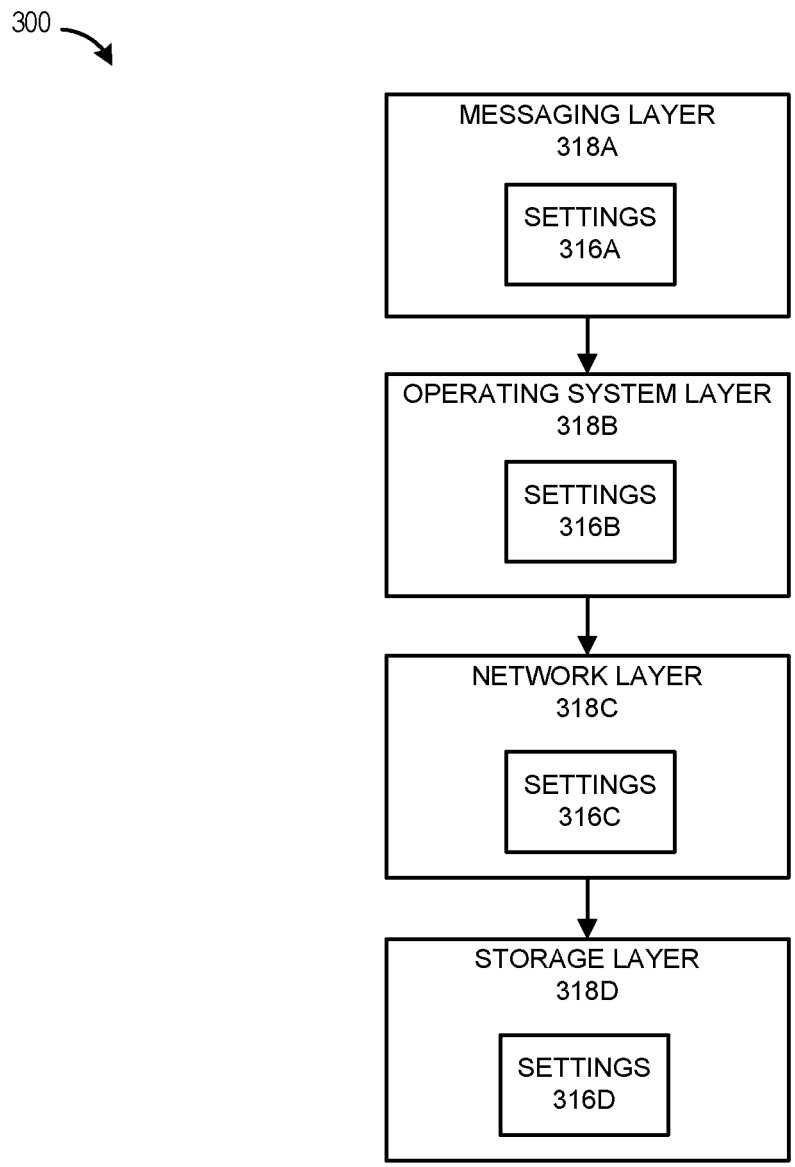
FIG. 3 illustrates an example of an arrangement of configuration settings for a message queue environment.

FIG. 3 illustrates an example of an arrangement 300 of configuration settings for a message queue environment such as the message queue environment 100 of FIG. 1. The arrangement 300 includes configuration settings 316A, 316B, 316C and 316D (collectively, configuration settings 316) distributed across a message queue layer 318A, an operating system layer 318B, a network layer 318C and a storage layer 318D (collectively, layers 318), respectively. The configuration settings 316 can be stored, for example, in the data store 116 of FIG. 1, although the settings themselves may be implemented, for example, on the messaging provider 108, the hosts 102, the network 110, etc.

The configuration settings 316A of the message queue layer 318A can include configuration settings that are established at the message queue provider 108. Examples of the configuration settings 316A are shown in Table 1. The configuration settings 316B of the operating system layer 318B can include settings of an operating system on which the messaging provider 108 is implemented. The configuration settings 316B can relate, for example, to memory and process management. Examples of the configuration settings 316B are shown in Table 2. The configuration settings 316C of the network layer 318C can include settings that impact network transmissions of the messaging provider 108. The configuration settings 316C can relate or map, for example, to TCP parameters. Examples of the configuration settings 316C are shown in Table 3. The configuration settings 316D of the storage layer 318D can include settings of a network file system (NFS) on which message queues are written or read. Examples of the configuration settings 316D are shown in Table 4.

TABLE 1

EXAMPLE CONFIGURATION SETTINGS AT MESSAGE QUEUE LAYER

| Example Setting | Description |
| --- | --- |
| Disconnect Interval (DISCINT) | This setting can represent the length of time after which a channel closes down, if no message arrives during that period. For example, a number of seconds from zero through 999,999 can be specified such that a value of zero means no disconnect (i.e., wait indefinitely). |
| Heartbeat Interval (HBINT) | This setting can represent the approximate time between heartbeat flows that are to be passed from a sending message channel agent (MCA) when there are no messages on the transmission queue. The value can be represented in seconds and, for example, be in the range 0 through 999,999. A value of zero can mean that no heartbeat flows are to be sent. In some cases, the default value can be 300. Oftentimes, the value is significantly less than the disconnect interval value. |
| Maximum Instances (MAXINST) | This setting can specify the maximum number of simultaneous instances of a server-connection channel that can be started. In various cases, this setting can be set, for example, from zero through 999,999,999. A value of zero can indicate that no client connections are allowed on this channel. In some cases, the default value can be 999,999,999. |
| Maximum instances per client (MAXINSTC) | This setting can specify the maximum number of simultaneous instances of a server-connection channel that can be started from a single client. In various cases, this setting can be set from zero through 999,999,999 such that a value of zero indicates that no client connections are allowed on this channel. The default value can be, for example, 999,999,999. |
| SHARECNV | In certain embodiments, there is a one-to-one relationship between channel instances and TCP/IP connections. For example, one TCP/IP connection can be created for every channel instance. If a channel is defined with the SHARECNV parameter set to a value greater than 1, then that number of conversations can share a channel instance. |
| Keepalive Interval (KAINT) | This setting can be used to specify a timeout value for a channel. The Keepalive Interval setting can be, for example, a value passed to the communications stack specifying the Keepalive timing for the channel. It can allow you to specify a different keepalive value for each channel. In general, the value can indicate a time, in seconds, and can be in the range of 0 to 99,999. A Keepalive Interval value of 0 can indicate that channel-specific Keepalive is not enabled for the channel and only the system-wide Keepalive value set in TCP/IP is used. |

TABLE 2

EXAMPLE CONFIGURATION SETTINGS AT OPERATING SYSTEM LAYER

| Example Setting | Description |
| --- | --- |
| semmsl | Maximum amount of semaphores permitted per set |
| semmns | Maximum number of semaphores |
| semopm | Maximum number of operations in single operations |
| semmni | Maximum number of semaphore sets on the system |
| shmmax | Maximum size of a shared-memory segment (e.g., in bytes) |
| shmmni | Maximum number of shared memory segments (e.g., in bytes) |
| shmall | Maximum size of a shared-memory segment (e.g., in bytes) |
| file-max | Maximum number of open files |
| nofile | Maximum number of open file descriptors |
| nproc | Maximum number of processes allowed to exist simultaneously |
| core_uses_pid | The default coredump filename is "core." By setting core_uses_pid to 1, the coredump filename becomes core.PID. If core_pattern does not include "% p" and core_uses_pid is set, then .PID will be appended to the filename. |
| msgmnb | Maximum number of bytes on a single message queue. |
| msgmax | Maximum System V IPC message size in bytes. |
| sem | In an example, this setting can includefour tokens: SEMMSL, SEMMNS, SEMOPM and SEMMNI. SEMMNS can be the result of SEMMSL multiplied by SEMMNI. The database manager may require that the number of arrays (SEMMNI) be increased as necessary. Typically, SEMMNI is approximately twice the maximum number of agents expected on the system multiplied by the number of logical partitions on the database server computer plus the number of local application connections on the database server computer. |
| shmmni | Maximum number of shared memory segments |
| rmem_max | Maximum amount for the receive socket memory |
| wmem_max | Maximum amount for the send socket memory |
| pid_max | PID allocation wrap value. When the kernel's next PID value reaches this value, it wraps back to a minimum PID value. PIDs of value pid_max or larger are not typically allocated. |
| vm.max_map_count | Maximum number of memory map areas a process may have. Memory map areas are sometimes used as a side-effect of calling malloc, directly by mmap and mprotect, and also when loading shared libraries. While most applications need less than a thousand maps, certain programs, particularly malloc debuggers, may consume lots of them, e.g., up to one or two maps per allocation. The default value can be, for example, 65,536. This setting |

TABLE 2-continued

EXAMPLE CONFIGURATION SETTINGS AT OPERATING SYSTEM LAYER

| Example Setting | Description |
| --- | --- |
| | limits the number of discrete mapped memory areas and, in general, does not itself impose a limit on the size of those areas or on the memory that is usable by a process. |

TABLE 3

EXAMPLE CONFIGURATION SETTINGS AT NETWORK LAYER

| Example Setting | Description |
| --- | --- |
| tcp_keepalive_time | The interval between the last data packet sent (simple ACKs are not considered data) and the first keepalive probe; after the connection is marked to need keepalive, this counter is not typically used any further. |
| net.ipv4.tcp_tw_reuse | This setting can allow reuse of sockets in TIME_WAIT state for new connections when it is safe from protocol viewpoint. Default value can be zero (disabled). It is generally a safer alternative to tcp_tw_recycle. |
| net.ipv4.ip_forward | This setting can indicate whther IP forwarding is enabled (e.g., a value of one can indicate that IP forwarding is enabled). |
| net.ipv4.conf.default.rp_filter | A value of one can indicate that the kernel will do source validation by confirming reverse path. A value of zero can indicate that source validation will not be performed. A value of two can indicate that, if the source address is routable with any of the routes on any of the interfaces, the packet is accepted (sometimes referred to as loose mode reverse filtering). |
| net.ipv4.conf.default.accept_source_route | Accept source routing (e.g., 0 = no and 1 = yes) |
| net.ipv4.tcp_syncookies | This setting can indicate whether TCP SYN cookie protection is enabled. If so (e.g., a value of one), the kernel handles TCP SYN packets normally until the queue is full, at which point the SYN cookie functionality kicks in. |
| net.ipv4.ip_local_port_range | This setting can define the local port range that is used by TCP and UDP traffic to choose the local port. For example, this setting can include two numbers, the first of which is the first local port allowed for TCP and UDP traffic on the server, the second of which is the last local port number. |
| net.ipv4.tcp_max_syn_backlog | This setting can set a maximum number of half-open connections to backlog queue. |
| net.ipv4.conf.all.send_redirects | The net.ipv4.conf.all.accept_redirects setting causes network interfaces to send ICMP redirect messages (e.g., 0 = Do not send ICMP redirects and 1 = Send ICMP redirects) |
| net.ipv4.conf.default.send_redirects | This setting can cause network interfaces to accept ICMP redirect messages only from gateways listed in the default gateway list. |
| net.ipv4.conf.default.accept_redirects | This setting can cause, for example, network interfaces (e.g., Linux network interfaces) to accept ICMP redirect messages. |
| net.ipv6.conf.all.accept_redirects | This setting can cause network interfaces (e.g., Linux network interfaces) to accept ICMP redirect messages. |
| net.ipv6.conf.default.accept_redirects | This setting can cause network interfaces (e.g., Linux network interfaces) to accept ICMP redirect messages. |
| net.ipv4.tcp_keepalive_time | The interval (e.g., in seconds) between the last data packet sent (e.g., simple ACKs are not considered data) and the first keepalive probe; after the connection is marked to need keepalive, this counter is not tpically used any further. |
| net.ipv4.tcp_keepalive_intvl | The interval (e.g., in seconds) between subsequential keepalive probes, regardless of what the connection has exchanged in the meantime. |
| net.ipv4.tcp_keepalive_probes | The number of unacknowledged probes to send before considering the connection dead and notifying the application layer (e.g., nine). |

TABLE 4

EXAMPLE CONFIGURATION SETTINGS AT STORAGE LAYER

| Example Setting | Description |
| --- | --- |
| rsize | The number of bytes a NFS uses when reading files from a network file system server. The value specified by this setting can be the maximum size that is used; however, the actual size used may be smaller. |
| wsize | The number of bytes NFS uses when writing files to an NFS server. The value specified by this setting can be the maximum size that is used; however, the actual size used may be smaller. |
| actimeo | A zero value for this setting can disable attribute caching on the client. This typically means that every reference to attributes is satisfied directly from the server though file data is still cached. |
| timeo | This setting determines the time the client needs to wait before it comes to a conclusion that it must retransmit the packet. The default value may be, for example, seven so as to represent seven tenths of a second. |

Figure 4:
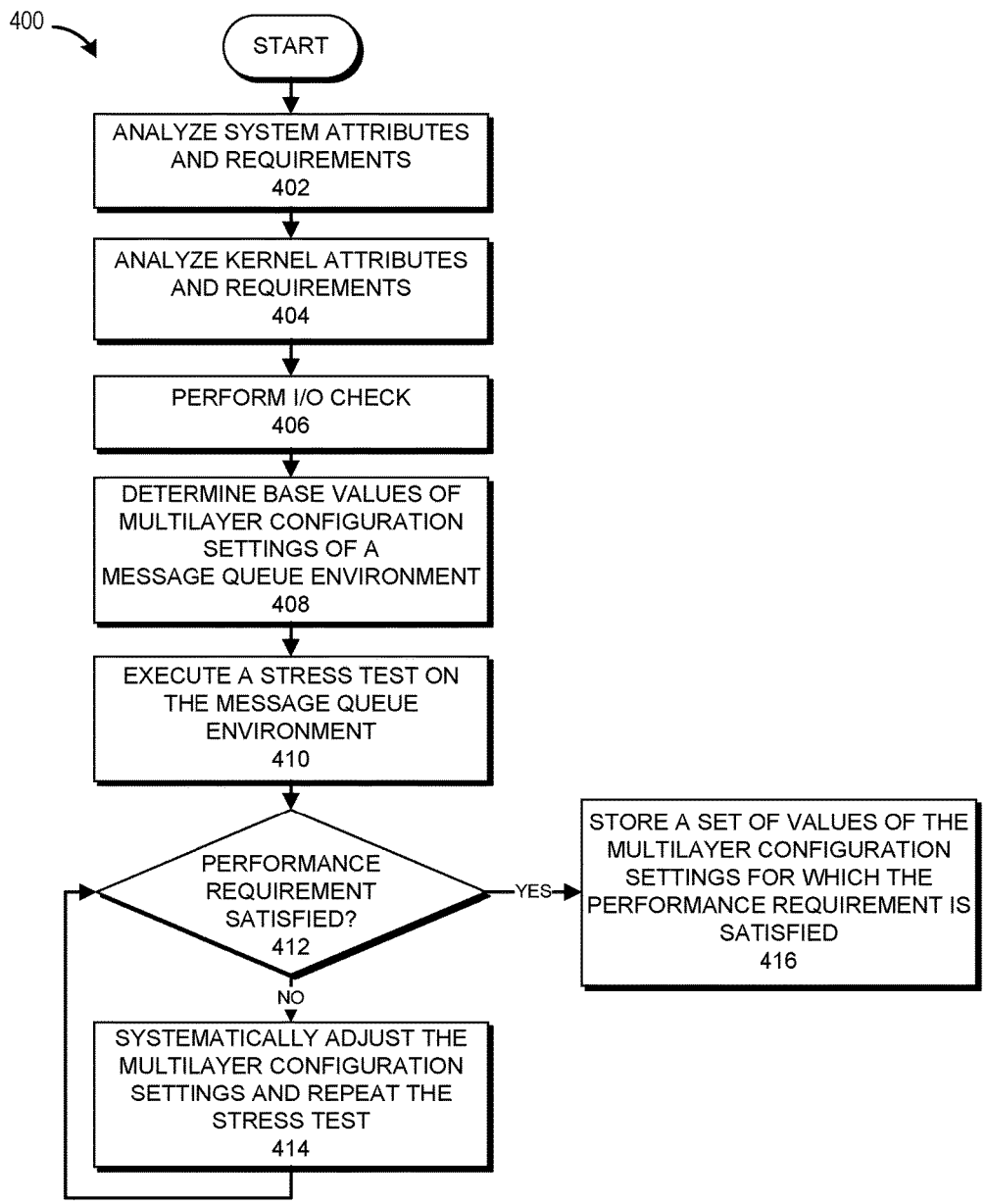
FIG. 4 illustrates an example of a process for optimizing or tuning a message queue environment.

FIG. 4 illustrates an example of a process 400 for optimizing or tuning a message queue environment. The process 400 can be implemented by any system that can access one or more data sources. For example, the process 400, in whole or in part, can be implemented by one or more of the hosts 102, the messaging provider 108 and/or the configuration system 112. The process 400 can also be performed generally by the message queue environment 100. Although any number of systems, in whole or in part, can implement the process 400, to simplify discussion, the process 400 will be described in relation to specific systems or subsystems of the message queue environment 100.

At block 402, the optimizer 114 analyzes system attributes and requirements. For example, the block 402 can include identifying, for a particular host of the hosts 102, system attributes such as an operating system kernel version, memory capacity, number and/or attributes of central processing units (CPUs), storage capacity, combinations of same and/or the like. In various cases, the particular host can be a physical host with local storage, a VM host with network storage, etc. In some embodiments, the block 402 can include identifying at least some of the system attributes via operating system-specific commands or functions (e.g., kernelcheck( ), memorycheck( ), swapcheck( ), cpucheck( ) and disksizecheck( ) in Linux-based environments). The block 402 can further include comparing the identified system attributes to system requirements, for example, of the messaging provider 108. In various embodiments, the block 402 can be performed, for example, by a shell script. Example output of the block 402 is shown in FIG. 5. In some cases, these outputs can be used by administrators or other users to enact configuration changes and/or hardware or software upgrades.

At block 404, the optimizer 114 analyzes kernel attributes and requirements. In various embodiments, the block 404 can include identifying kernel attributes using implementation-specific commands (e.g., a command that triggers verification that system requirements of a given message-queue product are satisfied) and referencing operating system-specific files (e.g., sysctl.conf and limits.conf in Linux environments). In various embodiments, the block 404 can include comparing the identified kernel attributes with corresponding requirements. In some cases, the comparison can involve comparing, for example, attributes of the referenced operating system-specific files with corresponding files in a designated implementation or image (e.g., a golden image). In various embodiments, the block 404 can be performed, for example, by a shell script. Example outputs of block 404 are shown in FIGS. 6-7. In some cases, these outputs can be used by administrators or other users to enact configuration changes.

At block 406, the optimizer 114 performs an input/output (I/O) check. In various embodiments, the block 406 can include sampling disk write speeds and calculating various metrics such as, for example, averages of rolling averages of recent I/O latency. In certain embodiments, outputs can be presented to an administrator or other user so as to trigger, for example, a root-cause analysis for any exceptionally high values. Example outputs of the block 406 are shown in FIG. 8. In some embodiments, blocks 402-406 may be omitted, for example, so as to proceed directly into optimization.

At block 408, the optimizer 114 determines base values of multilayer configuration settings of the message queue environment 100. In general, the multilayer configuration settings can include settings similar those described above in relation to Tables 1-4. In some embodiments, the base values can be stored in the data store 116 of FIG. 1. In addition, or alternatively, the base values can include default and/or pre-existing values for the multilayer configuration settings.

At block 410, the optimizer 114 executes a stress test on the message queue environment 100. In some embodiments, the block 410 can include executing a plurality of stress tests. In these embodiments, the stress tests can be executed in parallel, sequentially or a combination thereof. At decision block 412, the optimizer 114 determines whether a performance requirement has been satisfied. The performance requirement can be a stress-test-specific requirement that is indicative of satisfactory or optimized performance. In some cases, the optimizer 114 can determine whether a plurality of performance requirements have been satisfied. Example performance requirements with respect to example stress tests will be described in greater detail below.

If it is determined at decision block 412 that the performance requirement has been satisfied, at block 416, the optimizer 114 stores a set of values of the multilayer configuration settings for which the performance requirement is satisfied. In a typical embodiment, the stored set of values can be used for a subsequent execution of the message queue environment 100 (e.g., for a host, message queue and/or queue broker to which the values are applicable). For example, the optimizer 114 can set or cause the settings to be set on the messaging provider 108, on the applicable host of the hosts 102, etc., so that the settings will be used on the subsequent execution.

If it is determined at decision block 412 that the performance requirement has not been satisfied, at block 414, the optimizer 114 systematically adjusts values of the multilayer configuration settings and repeats the stress test with the adjusted values. In certain embodiments, blocks 412-414 represent a loop that results in the stress test being repeated at least until the message queue environment 100 is determined to satisfy the performance requirement at decision block 412. It should be appreciated that, in some cases, the loop can be exited using other criteria such as, for example, a maximum number of iterations, particular types and/or quantities of errors, user or administrator input, etc.

Throughout the iterations of block 412-414, if multiple iterations occur due to the performance requirement not being satisfied, the optimizer 114 can iterate through and individually adjust the multilayer configuration settings. In some cases, only a single setting can be adjusted at each iteration of the block 414. For example, with respect to FIG. 3, in some embodiments, the systematically adjusting can be implemented as four nested loops such that, going from outer loop to inner loop, the optimizer 114 iterates through the settings 316A of the messaging layer 318A, the settings 316B of the operating system layer 318B, the settings 316C of the network layer 318C and the settings 316D of the storage layer 318D. In other words, in these embodiments, the optimizer 114 can iterate through the settings 316A of the message queue layer such that: (1) for each of the settings 316A of the message queue layer 318A, the optimizer 114 iterates through the settings 316B of the operating system layer 318B; (2) for each of the settings 316B of the operating system layer 318B, the optimizer 114 iterates through the settings 316C of the network layer 318C; and (3) for each of the settings 316C of the network layer 318C, the optimizer 114 iterates through the settings 316D of the storage layer 318D. In that way, the optimizer 114 can individually adjust configuration settings as it iterates through the layers. In some cases, the optimizer 114 can recursively address the configuration settings by layer. In addition, in some cases, the optimizer 114 can continue to iterate the through the multilayer configuration settings even after the performance requirement has been satisfied so as to identify optimal values of the multilayer configuration settings (e.g., maximum throughput, maximum connections, etc.).

The systematic adjustment of configuration settings at block 414 can be done methodically to individual settings such as those shown with respect to Tables 1-4. In some embodiments, the optimizer 114 can adjust a given configuration setting according to rules contained or accessible to the optimizer 114. For example, the optimizer 114 can incrementally adjust a value upwards to a maximum, downwards to a minimum, or a combination thereof. In addition, or alternatively, the optimizer 114 can reference one or more alternative values that are stored in the optimizer 114 or accessible to the optimizer 114. It should thus be appreciated that, depending on a given implementation, there may be one or more alternative values for any given configuration setting. In certain embodiments, the optimizer 114 can systematically adjust each configuration setting until each possible or permitted alternative value has been used for the stress test.

In an example, the optimizer 114 can determine a maximum number of message queue connections for a particular message queue and corresponding queue broker of the message queue environment 100. According to this example, the optimizer 114 can produce burst connections on the particular queue broker (e.g., the queue broker 106A or the queue broker 106B of FIG. 1). In general, the optimizer 114 can load queue connection information (e.g., stored in the data store 116 and/or provided by an administrator or other user). Thereafter, the optimizer 114 can create a loop (e.g., an infinite loop) and instantiate new queue brokers so as to establish a connection to the queue broker being tested. Once each connection is established, the optimizer 114 can cause, for example, new put and get operations (with sample messages of 5 KB, 10 KB, etc.) on the particular message queue of the particular queue broker. If any error occurs (or certain types of errors occur), the optimizer 114 can catch the error and instantiate another infinite loop so as to establish queue broker connections. According to this example, the performance requirement can be a determination that the maximum number of connections before errors or crashing is at least a target number (e.g. thirty thousand).

In another example, the optimizer 114 can determine maximum message throughput for a particular message queue and corresponding queue broker of the message queue environment 100. In general, according to this example, the optimizer attempts to stress maximum I/O throughput to a particular queue broker such as, for example, the queue broker 106A or the queue broker 106B of FIG. 1, by generating significant message volume in a short duration of time. In general, the optimizer 114 can load queue connection information (e.g., stored in the data store 116 and/or provided by an administrator or other user). Thereafter, the optimizer 114 can create a loop (e.g., an infinite loop) and instantiate new queue brokers so as to establish a connection to the queue broker being tested. Once each connection is established, the optimizer 114 can cause, for example, new put and get operations (with larger sample messages of 5 MB, 8 MB, etc.) on the particular message queue of the particular queue broker. If any error occurs (or certain types of errors occur), the optimizer 114 can catch the error and instantiate another infinite loop so as to establish queue broker connections. According to this example, the performance requirement can be a determination that the messaging queue environment 100 can remain stable with a threshold throughput value (e.g., 32,000 client connections to the messaging provider 108) without depleting resources of the applicable host or other computer system.

In another example, the optimizer 114 can both: (1) determine a maximum number of message queue connections for a particular message queue and corresponding queue broker of the message queue environment 100 as described above; and (2) determine maximum message throughput for a particular message queue and corresponding queue broker of the message queue environment 100 as described above. According to this example, both of these determinations can execute, in parallel and/or sequentially, as the stress test.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a computer system:
   determining base values of multilayer configuration settings of a message queue environment, wherein the multilayer configuration settings are distributed across a plurality of layers of the message queue environment, the plurality of layers comprising a message queue layer, an operating system layer, a network layer and a storage layer, and wherein the multilayer configuration settings comprise message-queue layer settings, operating-system layer settings, network layer settings and storage layer settings;
   executing a stress test on the message queue environment using the determined base values of the multilayer configuration settings;
   systematically adjusting the multilayer configuration settings and repeating the stress test at least until the message queue environment satisfies a performance requirement, wherein the systematically adjusting comprises:
      iterating through and individually adjusting the message-queue layer settings,
      the iterating through and individually adjusting the message-queue layer settings comprising, for each message-queue layer setting, iterating through and individually adjusting the operating-system layer settings,
      the iterating through and individually adjusting the operating-system layer settings comprising, for each operating-system layer setting, iterating through and individually adjusting the network layer settings, and
      the iterating through and individually adjusting the network layer settings comprising, for each network layer setting, iterating through and individually adjusting the storage layer settings;
   storing a set of values of the multilayer configuration settings for which the message queue environment has satisfied the performance requirement; and
   using the stored set of values for a subsequent execution of the message queue environment.

2. The method of claim 1, comprising recursively addressing the multilayer configuration settings by layer.

3. The method of claim 1, wherein only one configuration setting is adjust per re-execution of the stress test.

4. The method of claim 1, wherein the stress test determines a maximum number of message-queue connections for the message queue environment.

5. The method of claim 1, wherein the stress test determines message throughput of the message queue environment.

6. The method of claim 1, wherein the stress test:
   determines a maximum number of message-queue connections for the message queue environment; and
   determines message throughput of the message queue environment.

7. An information handling system comprising at least one processor, wherein the at least one processor is operable to implement a method comprising:
   determining base values of multilayer configuration settings of a message queue environment, wherein the multilayer configuration settings are distributed across a plurality of layers of the message queue environment, the plurality of layers comprising a message queue layer, an operating system layer, a network layer and a storage layer, and wherein the multilayer configuration settings comprise message-queue layer settings, operating-system layer settings, network layer settings and storage layer settings;
   executing a stress test on the message queue environment using the determined base values of the multilayer configuration settings;
   systematically adjusting the multilayer configuration settings and repeating the stress test at least until the message queue environment satisfies a performance requirement, wherein the systematically adjusting comprises:
      iterating through and individually adjusting the message-queue layer settings,
      the iterating through and individually adjusting the message-queue layer settings comprising, for each message-queue layer setting, iterating through and individually adjusting the operating-system layer settings,
      the iterating through and individually adjusting the operating-system layer settings comprising, for each operating-system layer setting, iterating through and individually adjusting the network layer settings, and
      the iterating through and individually adjusting the network layer settings comprising, for each network layer setting, iterating through and individually adjusting the storage layer settings;
   storing a set of values of the multilayer configuration settings for which the message queue environment has satisfied the performance requirement; and
   using the stored set of values for a subsequent execution of the message queue environment.

8. The information handling system of claim 7, the method comprising recursively addressing the multilayer configuration settings by layer.

9. The information handling system of claim 7, wherein only one configuration setting is adjust per re-execution of the stress test.

10. The information handling system of claim 7, wherein the stress test determines a maximum number of message-queue connections for the message queue environment.

11. The information handling system of claim 7, wherein the stress test determines message throughput of the message queue environment.

12. The information handling system of claim 7, wherein the stress test:
   determines a maximum number of message-queue connections for the message queue environment; and
   determines message throughput of the message queue environment.

13. A computer-program product comprising a non-transitory computer-usable medium having computer-readable program code embodied therein, the computer-readable program code adapted to be executed to implement a method comprising:
   determining base values of multilayer configuration settings of a message queue environment, wherein the multilayer configuration settings are distributed across a plurality of layers of the message queue environment, the plurality of layers comprising a message queue layer, an operating system layer, a network layer and a storage layer, and wherein the multilayer configuration settings comprise message-queue layer settings, operating-system layer settings, network layer settings and storage layer settings;

executing a stress test on the message queue environment using the determined base values of the multilayer configuration settings;

systematically adjusting the multilayer configuration settings and repeating the stress test at least until the message queue environment satisfies a performance requirement, wherein the systematically adjusting comprises:

iterating through and individually adjusting the message-queue layer settings, the iterating through and individually adjusting the message-queue layer settings comprising, for each message-queue layer setting, iterating through and individually adjusting the operating-system layer settings, the iterating through and individually adjusting the operating-system layer settings comprising, for each operating-system layer setting, iterating through and individually adjusting the network layer settings, and the iterating through and individually adjusting the network layer settings comprising, for each network layer setting, iterating through and individually adjusting the storage layer settings;

storing a set of values of the multilayer configuration settings for which the message queue environment has satisfied the performance requirement; and using the stored set of values for a subsequent execution of the message queue environment.

14. The computer-program product of claim 13, the method comprising recursively addressing the multilayer configuration settings by layer.

15. The computer-program product of claim 13, wherein only one configuration setting is adjust per re-execution of the stress test.

16. The computer-program product of claim 13, wherein the stress test determines a maximum number of message-queue connections for the message queue environment.

17. The computer-program product of claim 13, wherein the stress test determines message throughput of the message queue environment.

\* \* \* \* \*